US008351197B2

(12) United States Patent
Lo

(10) Patent No.: US 8,351,197 B2
(45) Date of Patent: Jan. 8, 2013

(54) HOLDING DEVICE FOR HARD DISK DRIVE

(75) Inventor: Wu-Jen Lo, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 97 days.

(21) Appl. No.: 13/097,088

(22) Filed: Apr. 29, 2011

(65) Prior Publication Data
US 2012/0212898 A1 Aug. 23, 2012

(30) Foreign Application Priority Data
Feb. 18, 2011 (CN) ............... 2011 2 0041372 U

(51) Int. Cl.
*G06F 1/16* (2006.01)
*H05K 5/00* (2006.01)
*H05K 7/00* (2006.01)
(52) U.S. Cl. .................. 361/679.34; 361/679.33
(58) Field of Classification Search ........... 361/679.33–679.45; 174/50
See application file for complete search history.

(56) References Cited

U.S. PATENT DOCUMENTS

| | | | | |
|---|---|---|---|---|
| 4,672,510 A * | 6/1987 | Castner | ............... | 361/679.32 |
| 5,301,088 A * | 4/1994 | Liu | ............... | 361/679.58 |
| 5,586,002 A * | 12/1996 | Notarianni | ............... | 361/679.26 |
| 5,788,211 A * | 8/1998 | Astier | ............... | 248/674 |
| 6,201,867 B1 * | 3/2001 | Koike | ............... | 379/433.11 |
| 6,219,252 B1 * | 4/2001 | Tsai | ............... | 361/752 |
| 6,351,378 B1 * | 2/2002 | Chao et al. | ............... | 361/679.33 |
| 6,560,102 B1 * | 5/2003 | Tong et al. | ............... | 361/679.41 |
| 6,570,756 B2 * | 5/2003 | Alfonso et al. | ............... | 361/679.57 |
| 6,775,132 B2 * | 8/2004 | Chen et al. | ............... | 361/679.33 |
| 6,798,652 B2 * | 9/2004 | Wang et al. | ............... | 361/679.33 |
| 6,867,942 B2 * | 3/2005 | Albrecht et al. | ............... | 360/69 |
| 7,016,190 B1 * | 3/2006 | Chang | ............... | 361/679.33 |
| 7,054,153 B2 * | 5/2006 | Lewis et al. | ............... | 361/679.33 |
| 7,179,991 B2 * | 2/2007 | Chen et al. | ............... | 174/50 |
| 7,520,389 B2 * | 4/2009 | Lalouette | ............... | 206/722 |
| 7,701,703 B2 * | 4/2010 | Peng et al. | ............... | 361/679.33 |
| 7,782,606 B2 * | 8/2010 | Baker et al. | ............... | 361/679.39 |
| 7,903,401 B2 * | 3/2011 | Lee et al. | ............... | 361/679.33 |
| 8,051,980 B2 * | 11/2011 | Tai et al. | ............... | 206/320 |
| 8,064,196 B2 * | 11/2011 | Furuta | ............... | 361/679.37 |
| 8,218,315 B2 * | 7/2012 | Lu | ............... | 361/679.58 |
| 8,240,627 B2 * | 8/2012 | Chen et al. | ............... | 248/309.1 |
| 2002/0044416 A1 * | 4/2002 | Harmon et al. | ............... | 361/685 |
| 2003/0011980 A1 * | 1/2003 | Albrecht et al. | ............... | 361/685 |
| 2003/0174464 A1 * | 9/2003 | Funawatari et al. | ............... | 361/685 |
| 2004/0032711 A1 * | 2/2004 | Kaczeus et al. | ............... | 361/685 |
| 2004/0070926 A1 * | 4/2004 | Boykin et al. | ............... | 361/683 |

(Continued)

*Primary Examiner* — Adrian S Wilson
(74) *Attorney, Agent, or Firm* — Altis Law Group, Inc.

(57) ABSTRACT

A holding device for holding a HDD includes two elastic members and two frame members. The HDD includes a first end and a second end. The two elastic members are configured for respectively encasing the first end and the second end. Each frame member includes a base portion, a first sidewall, a second sidewall, and at least one pair of clamping portions. The base portion includes a first surface and a second surface opposite to the first surface. The first and second sidewalls extend from two opposite ends of the base portion. The first sidewall, the second sidewall, and the first surface cooperatively define a groove for receiving a corresponding one of the two elastic members. The clamping portions in each pair of clamping portion extends out from the first sidewall and the second sidewall and configured for engaging with a corresponding pair of clamping portions of another frame member.

10 Claims, 3 Drawing Sheets

U.S. PATENT DOCUMENTS

| | | | |
|---|---|---|---|
| 2004/0105229 A1* | 6/2004 | Wang et al. | 361/685 |
| 2005/0088778 A1* | 4/2005 | Chen et al. | 360/97.02 |
| 2005/0088815 A1* | 4/2005 | Chen et al. | 361/685 |
| 2007/0263349 A1* | 11/2007 | Yi et al. | 361/685 |
| 2007/0263351 A1* | 11/2007 | Ho et al. | 361/685 |
| 2008/0013272 A1* | 1/2008 | Bailey et al. | 361/685 |
| 2008/0037211 A1* | 2/2008 | Martin et al. | 361/685 |
| 2008/0037212 A1* | 2/2008 | Wang | 361/685 |
| 2008/0083547 A1* | 4/2008 | Pinol Pedret et al. | 174/50 |
| 2008/0157638 A1* | 7/2008 | Liu et al. | 312/223.2 |
| 2008/0158808 A1* | 7/2008 | Camarena et al. | 361/685 |
| 2009/0111543 A1* | 4/2009 | Tai et al. | 455/575.8 |
| 2009/0114556 A1* | 5/2009 | Tai et al. | 206/320 |
| 2009/0129009 A1* | 5/2009 | Zhang et al. | 361/679.34 |
| 2009/0279244 A1* | 11/2009 | Crippen et al. | 361/679.33 |
| 2011/0002095 A1* | 1/2011 | Furuta | 361/679.01 |
| 2011/0013355 A1* | 1/2011 | Chen | 361/679.33 |
| 2011/0017747 A1* | 1/2011 | Wildman et al. | 220/560.01 |
| 2011/0134598 A1* | 6/2011 | Hsiao | 361/679.33 |
| 2011/0255235 A1* | 10/2011 | Chen | 361/679.33 |

* cited by examiner

HOLDING DEVICE FOR HARD DISK DRIVE

BACKGROUND

1. Technical Field

The disclosure generally relates to holding devices and, particularly, to a holding device for holding hard disk drives (HDDs).

2. Description of Related Art

HDDs are usually fastened to a holding device by screws. To protect the HDD from being damaged by shocks and heavy vibrations, elastic tubes are sleeved on the screws to act shock absorbers. However, the employment of the elastic tubes complicates the assembly process of the HDD and the holding device, decreasing efficiency of the process.

Therefore, what needed is a holding device, which can overcome the above shortcomings.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Embodiments of the present disclosure will now be described in detail below and with reference to the drawings.

Figure 1:
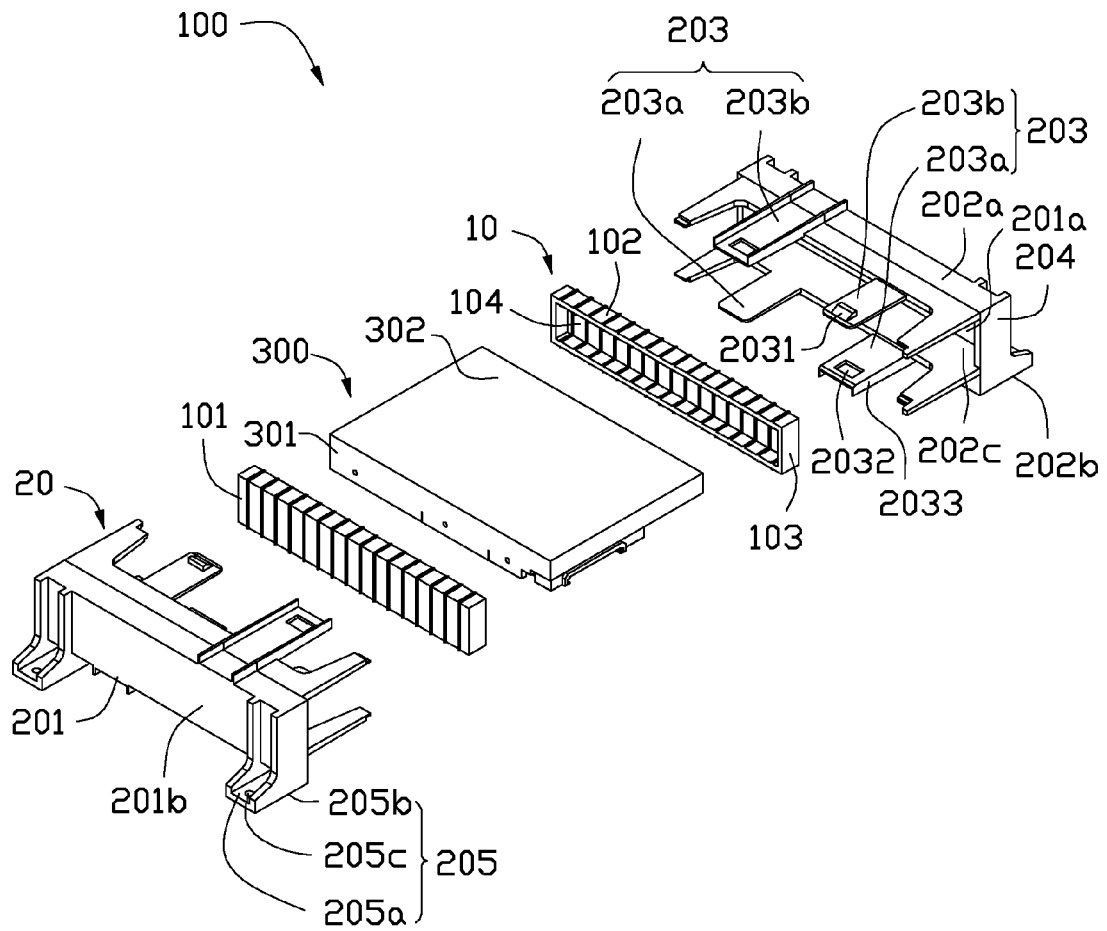
FIG. 1 is an isometric, exploded view of a holding device for holding an HDD in accordance with an exemplary embodiment.
Figure 2:
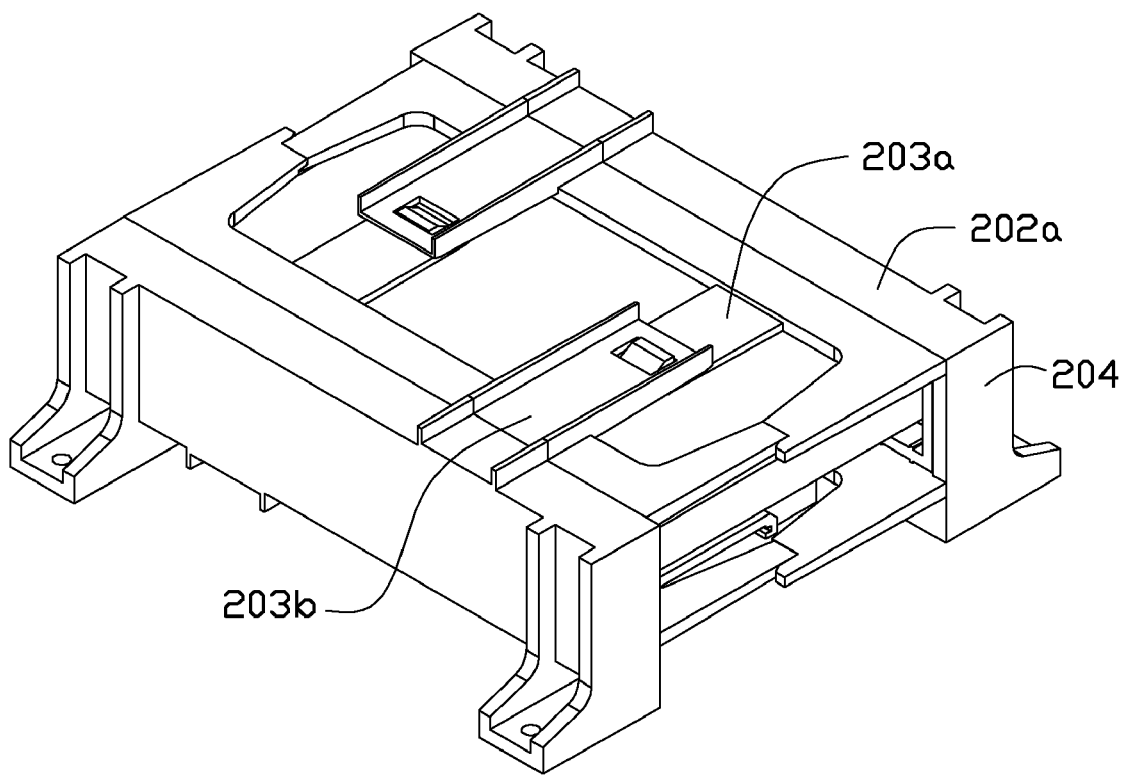
FIG. 2 is an assembled view of the holding device and the HDD of FIG. 1.
Figure 3:
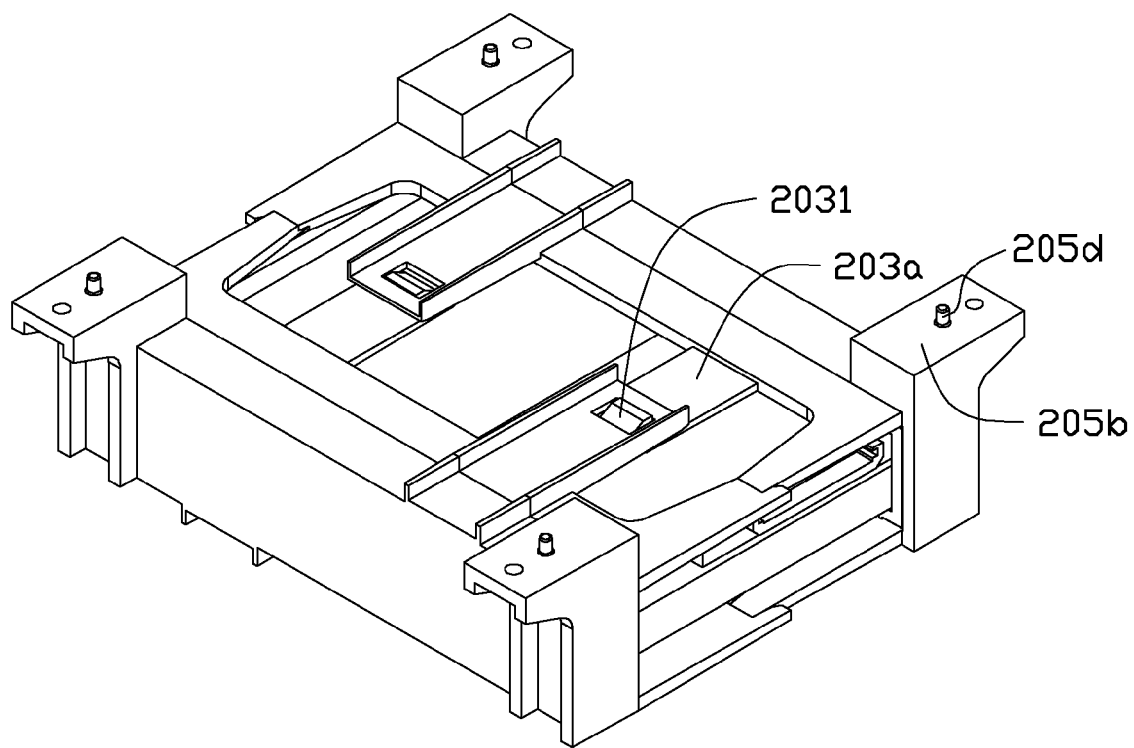
FIG. 3 is similar to FIG. 2, but viewed from another angle.

Referring to FIG. 1 to FIG. 3, a holding device 100 in accordance with an exemplary embodiment is shown. The holding device 100 is configured for holding a hard disk drive (HDD) 300. The HDD 300 is generally rectangular and includes a first end 301 and a second end 302 opposite to the first end 301.

The holding device 100 includes two elastic members 10 and two frame members 20.

The two elastic members 10 are made of elastic material such as rubber. Each elastic member 10 includes a generally rectangular plate portion 101, a pair of first walls 102 extending up from two respective long sides of the plate portion 101, and a pair of second walls 103 extending up from two respective short sides of the plate portion 101. The plate portion 101, the first walls 102, and the second walls 103 cooperatively define a receiving space 104. The receiving space 104 is configured for receiving a corresponding end of the HDD 300. In alternative embodiments, each elastic member 10 may include only the plate portion 101 and the pair of first walls 102 to form the receiving space 104 or each elastic member 10 may include only the pair of first walls 102 and the second walls 103 to form the receiving space 104.

The two frame members 20 are made of plastic by, e.g., injection molding. Each frame member 20 is integratedly formed and includes a generally rectangular base portion 201, a first sidewall 202a, a second sidewall 202b, two pairs of clamping portions 203, a pair of limiting walls 204, and a pair of connection portions 205. The base portion 201 includes a first surface 201a and a second surface 201b opposite to the first surface 201a. The first sidewall 202a and the second sidewall 202b perpendicularly extend from two respective long sides of the first surface 201a. The first sidewall 202a, the second sidewall 202b, and the first surface 201a cooperatively define a groove 202c. The groove 202c is configured to receive a corresponding elastic member 10.

Each pair of clamping portions 203 includes a clamping arm 203a and an engaging arm 203b. The two clamping arms 203a respectively extend from the first sidewall 202a and the second sidewall 202b. The two engaging arms 203b also extend from the first sidewall 202a and the second sidewall 202b. The clamping arm 203a and the engaging arm 203b in the same pair of clamping portions 203 are aligned with each other.

The clamping arm 203a is generally an elongated plate and includes a hook 2031 protruding from a surface opposite to the corresponding engaging arm 203b at an end of the clamping arm 203a away from the first sidewall 202a or the second sidewall 202b. The engaging arm 203b opposite to the corresponding clamping arm 203a is generally an elongated plate and defines a through hole 2032 opposite to the corresponding hook 2031. A pair of ribs 2033 extends up from two long sides of the engaging arm 203b opposite to the corresponding clamping arm 203a. The ribs 2033 are configured to reinforce the engaging arm 203b.

The pair of limiting walls 204 extends up from two short sides of the first surface 201a. Each limiting wall 204 is connected between the first sidewall 202a and the second sidewall 202b.

The pair of connection portions 205 extends out from the second surface 201b. Each connection portion 205 is plated-shape and includes a top surface 205a, a bottom surface 205b opposite to the top surface 205a, and a cylinder aligning portion 205d perpendicularly extending from the bottom surface 205b. The connection portion 205 also defines a mounting hole 205c extending from the top surface 205a to the bottom surface 205b. The mounting hole 205c is configured to be mounted to an external mounting plate (not shown). The aligning portion 205d is configured to align with an aligning hole of the external mounting plate. The bottom surface 205b is parallel to the second sidewall 202b and protrudes out of the second sidewall 202b.

When assembling the HDD 300 to the holding device 100, the first end 301 and the second end 302 are respectively received in the receiving spaces 104 of the two elastic members 10. Then the two elastic members 10 are respectively received in the grooves 202c of the two frame members 20. The hooks 2031 of one of the frame members 20 are engaged with the through holes 2032 of the other frame member 20. Thus, the two frame members 20 are clamped to each other by the clamping portions 203.

The first end 301 and the second end 302 are encased by the two elastic members 10, thus, the HDD 300 is well protected from shock. The two frame members 20 can be efficiently assembled using the corresponding clamping portions 203. The clamping portions 203 of the two frame members 20 are configured to clamp together. In alternative embodiments, the frame member 20 may include only a pair of clamping portions 203 or more than two pairs of clamping portions 203. The limiting walls 204 are configured to prevent the elastic member 10 being pushed out of the groove 203c.

It is understood that the above-described embodiment is intended to illustrate rather than limit the disclosure. Variations may be made to the embodiment without departing from the spirit of the disclosure. Accordingly, it is appropriate that the appended claims be construed broadly and in a manner consistent with the scope of the disclosure.

What is claimed is:

1. A holding device for holding a hard disk drive, the hard disk drive comprising a first end and a second end, the holding device comprising:
two elastic members, one elastic member being configured for encasing the first end, and the other elastic member being configured for encasing the second end; and
two frame members, each frame member comprising:
a base portion comprising a first surface and a second surface opposite to the first surface;
a first sidewall;
a second sidewall, the first and second sidewalls extending from two opposite ends of the base portion, the first sidewall, the second sidewall, and the first surface cooperatively defining a groove, the groove receiving a corresponding one of the two elastic members and
two pairs of clamping portions, the clamping portions in each pair of clamping portions extending out from the first sidewall and the second sidewall and configured for engaging with a corresponding pair of clamping portions of another frame member;
wherein each pair of clamping portions comprises a clamping arm and an engaging arm, the two clamping arms of the two pairs of clamping portions extend from the first sidewall and the second sidewall respectively, the two engaging arms of the two pairs of clamping portions also extend from the first sidewall and the second sidewall, the clamping arm and the engaging arm in each pair of clamping portions are aligned with each other, each engaging arm comprises a pair of ribs, the ribs extend up from two long sides of the engaging arm.

2. The holding device of claim 1, wherein each clamping arm is an elongated plate and comprises a hook, the hook protrudes from a surface of the clamping arm, each engaging arm is an elongated plate and defines a through hole configured for receiving the hook of a corresponding clamping arm of another frame member.

3. The holding device of claim 1, wherein each frame member comprises a pair of limiting walls opposite to each other and extending outwardly form the first surface, each limiting wall connects between the first sidewall and the second sidewall.

4. The holding device of claim 1, wherein each elastic members comprises a rectangular plate portion, a pair of first walls perpendicularly connecting to two opposite ends of the plate portion, and a pair of second walls perpendicularly connecting to another two opposite ends of the plate portion, the plate portion, the first walls and the second walls cooperatively defines a receiving space for encasing a corresponding one of the first and second ends.

5. The holding device of claim 1, wherein each elastic member comprises a rectangular plate portion, a pair of first walls perpendicularly connecting to two opposite ends of the plate portion, the plate portion and the first walls cooperatively defines a receiving space for encasing a corresponding one of the first and second ends.

6. The holding device of claim 1, wherein each elastic member comprises a pair of first walls opposite to each other and a pair of second walls opposite to each other, each second wall perpendicularly connects with the first walls, the first walls and the second walls cooperatively defines a receiving space for encasing a corresponding one of the first and second ends.

7. The holding device of claim 1, wherein each frame member comprises a pair of connection portions extending out from the second surface, each connection portion is plated-shape and comprises a top surface, a bottom surface opposite to the top surface, and a cylinder aligning portion perpendicularly extending from the bottom surface, each connection portion also defines a mounting hole through the top surface and the bottom surface.

8. The holding device of claim 1, wherein the elastic members are made of rubber.

9. The holding device of claim 1, wherein the frame members are made of plastic by injection molding.

10. A holding device for holding a hard disk drive, the hard disk drive comprising a first end and a second end, the holding device comprising:
two elastic members, each elastic member defining a receiving space for receiving a corresponding one of the first end and the second end; and
two frame members, each frame member defining a groove configured for receiving one of the elastic members, each frame member comprising two pairs of clamping portions, the clamping portions of one frame member being configured for engaging with the clamping portions of another frame member to hold the hard disk drive therebetween;
wherein each pair of clamping portions comprises a clamping arm and an engaging arm, the two clamping arms of the two pairs of clamping portions extend from the first sidewall and the second sidewall respectively, the two engaging arms of the two pairs of clamping portions also extend from the first sidewall and the second sidewall, the clamping arm and the engaging arm in each pair of clamping portions are aligned with each other, each engaging arm comprises a pair of ribs, the ribs extend up from two long sides of the engaging arm.

* * * * *